United States Patent
Alsup et al.

(10) Patent No.: US 7,197,630 B1
(45) Date of Patent: Mar. 27, 2007

(54) METHOD AND SYSTEM FOR CHANGING THE EXECUTABLE STATUS OF AN OPERATION FOLLOWING A BRANCH MISPREDICTION WITHOUT REFETCHING THE OPERATION

(75) Inventors: Mitchell Alsup, Austin, TX (US); Benjamin T. Sander, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 356 days.

(21) Appl. No.: 10/822,468

(22) Filed: Apr. 12, 2004

(51) Int. Cl.
*G06F 9/40* (2006.01)

(52) U.S. Cl. .................. 712/239; 712/233; 712/237; 712/240

(58) Field of Classification Search ............... 712/239, 712/233, 237, 240
See application file for complete search history.

(56) References Cited

U.S. PATENT DOCUMENTS

| | | | |
|---|---|---|---|
| 3,896,419 A | 7/1975 | Lange et al. | |
| 5,210,843 A | 5/1993 | Ayers | |
| 5,381,533 A | 1/1995 | Peleg | |
| 5,881,261 A | 3/1999 | Favor et al. | |
| 5,896,528 A | 4/1999 | Katsuno et al. | |
| 5,930,497 A | 7/1999 | Cherian et al. | |
| 6,014,742 A | 1/2000 | Krick et al. | |
| 6,167,536 A | 12/2000 | Moann | |
| 6,185,675 B1 | 2/2001 | Kranich et al. | |
| 6,195,744 B1 | 2/2001 | Favor et al. | |
| 6,216,206 B1 | 4/2001 | Peled et al. | |
| 6,233,678 B1 | 5/2001 | Bala | |

(Continued)

FOREIGN PATENT DOCUMENTS

EP 957428 11/1999

(Continued)

OTHER PUBLICATIONS

E. Rotenberg, S. Bennett, and J.E. Smith, Trace Cache: A Low Latency Approach to High Bandwidth Instruction Fetching, In Proceedings of the 29th Annual International Symposium on Microarchitecture, Nov. 1996. p. 3.*

(Continued)

*Primary Examiner*—Fritz Fleming
*Assistant Examiner*—Vincent Lai
(74) *Attorney, Agent, or Firm*—Robert C Kowert; Meyertons, Hood, Kivlin, Kowert & Goetzel, P.c.

(57) ABSTRACT

A method and system for changing the executable status of an operation following a branch misprediction. In one embodiment, a method may include predicting an execution path of a first conditional branch operation stored in an entry of a trace cache, and in response to predicting the execution path, if a first operation stored in the entry of the trace cache is not in the execution path according to the prediction, assigning to the first operation a non-executable status indicative that the first operation is not in the execution path. The method may further include detecting that the prediction is incorrect subsequent to assigning the non-executable status to the first operation and assigning an executable status to the first operation in response to detecting the incorrect prediction, where the executable status is indicative that the first operation is in the execution path.

26 Claims, 7 Drawing Sheets

U.S. PATENT DOCUMENTS

| | | | |
|---|---|---|---|
| 6,247,121 B1 | 6/2001 | Akkary et al. | |
| 6,256,727 B1 | 7/2001 | McDonald | |
| 6,256,728 B1 * | 7/2001 | Witt et al. | 712/236 |
| 6,339,822 B1 | 1/2002 | Miller | |
| 6,345,295 B1 | 2/2002 | Beardsley et al. | |
| 6,357,016 B1 | 3/2002 | Rodgers et al. | |
| 6,449,714 B1 | 9/2002 | Sinharoy | |
| 6,493,821 B1 | 12/2002 | D'Sa et al. | |
| 6,578,128 B1 | 6/2003 | Arsenault et al. | |
| 6,823,428 B2 | 11/2004 | Rodriguez et al. | |
| 6,973,543 B1 | 12/2005 | Hughes | |
| 7,003,629 B1 | 2/2006 | Alsup | |
| 2002/0095553 A1 | 7/2002 | Mendelson et al. | |
| 2002/0144101 A1 | 10/2002 | Wang et al. | |
| 2003/0023835 A1 | 1/2003 | Kalafatis et al. | |
| 2004/0083352 A1 | 4/2004 | Lee | |
| 2004/0143721 A1 | 7/2004 | Pickett et al. | |
| 2004/0193857 A1 | 9/2004 | Miller et al. | |
| 2004/0216091 A1 | 10/2004 | Groeschel | |
| 2005/0076180 A1 | 4/2005 | Smaus et al. | |
| 2005/0125613 A1 | 6/2005 | Kim et al. | |
| 2005/0125632 A1 | 6/2005 | Alsup et al. | |

FOREIGN PATENT DOCUMENTS

| | | |
|---|---|---|
| GB | 2281101 | 4/2003 |

OTHER PUBLICATIONS

Friendly et al., Putting the Fill Unit to Work: Dynamic Optimizations for Trace Cache Microprocessors, 1998 IEEE, (pp. 173-181).
Lai et al., "Dead-Block Prediction & Dead-Block Correlating Prefetchers," 2001 IEEE, (11 Pages).
Jacobson, et al., "Instruction Pre-Processing in Trace Processors," IEEE Xplore, Jan. 1999, 6 pages.
Yuan Chou, et al., "Instruction Path Coprocessors," Mar. 2000, pp. 1-24.
Sanjay J. Patel, et al., "replay: A Hardware Framework for Dynamic Optimization," IEEE, vol. 50, No. 6, Jun. 2001, pp. 590-608.
Patterson, et al., "Computer Architecture A Quantitative Approach," Second Edition, Morgan Kaufmann Publishers, Inc., 1996, pp. 271-278.
Bryan Black, et al., "The Block-Based Trace Cache," IEEE, 1999, pp. 196-207.
Hinton, G., et al., "A 0.18-MUM CMOS IA-32 Processor with a 4-GHz Integer Execution Unit," IEEE Journal of Solid-State Circuits, vol. 36, No. 11, Nov. 2001, pp. 1617-1627.
Palmer, et al., "Fido: A Cache That Learns to Fetch," Proceedings of the 17th International Conference on Very Large Data Bases, Barcelona, Sep. 1991, pp. 255-264.
Chen et al., "Eviction Based Cache Placement for Storage Caches," USENIX 2003 Annual Technical Conference, (13 pages).
Merten, et al., "An Architectural Framework for Run-Time Optimization," Jun. 2001, pp. 1-43.
Jourdan, et al., "Increasing the Instruction-Level Parallelism through Data-Flow Manipulation," Intel, 11 pages.
Bryan Black, et al., "Turboscalar: A High Frequency High IPC Microarchitecture," Dept. of Electrical and Computer Engineering, Carnegie Mellon Univ., Jun. 2000.
Grant Braught, "Clas #21-Assemblers, Labels & Pseudo Instructions," Dickenson College, Fall Semester 2000, 6 pages.
U.S. Appl. No. 10/676,437, filed Oct. 1, 2003, Alsup, et al.
U.S. Appl. No. 10/615,506, filed Jul. 8, 2003, Alsup.
U.S. Appl. No. 10/755,742, filed Jan. 12, 2004, Smaus, et al.

* cited by examiner

METHOD AND SYSTEM FOR CHANGING THE EXECUTABLE STATUS OF AN OPERATION FOLLOWING A BRANCH MISPREDICTION WITHOUT REFETCHING THE OPERATION

BACKGROUND OF THE INVENTION

1. Field of the Invention

This invention is related to the field of microprocessors, and more particularly, to branch misprediction recovery mechanisms in a microprocessor.

2. Description of the Related Art

Instructions processed in a microprocessor are encoded as a sequence of ones and zeros. For some processor architectures, instructions may be encoded with a fixed length, such as a certain number of bytes. For other architectures, such as the x86 architecture, the length of instructions may vary. The x86 microprocessor architecture specifies a variable length instruction set (i.e., an instruction set in which various instructions are each specified by differing numbers of bytes). For example, the 80386 and later versions of x86 microprocessors employ between 1 and 15 bytes to specify a particular instruction. Instructions have an opcode, which may be 1–2 bytes, and additional bytes may be added to specify addressing modes, operands, and additional details regarding the instruction to be executed.

In some microprocessor architectures, each instruction may be decoded into one or more simpler operations prior to execution. Decoding an instruction may also involve accessing a register renaming map in order to determine the physical register with which each logical register in the instruction is associated and/or to allocate a physical register to store the result of the instruction.

Instructions are fetched into the decode portion of a microprocessor based, in part, on branch predictions made within the processor. In general, the bandwidth of the instruction fetch and decode portions of a microprocessor may determine whether the execution cores can be fully utilized during each execution cycle. However, incorrect branch predictions may degrade the bandwidth of the instruction fetch and decode logic as time and resources are wasted in fetching, decoding, and executing instructions on an incorrectly predicted path.

SUMMARY

Various embodiments of a method and system for changing the executable status of an operation following a branch misprediction are disclosed. In one embodiment, a method may include predicting an execution path of a first conditional branch operation stored in an entry of a trace cache, and in response to predicting the execution path, if a first operation stored in the entry of the trace cache is not in the execution path according to the prediction, assigning to the first operation a non-executable status indicative that the first operation is not in the execution path. The method may further include detecting that the prediction is incorrect subsequent to assigning the non-executable status to the first operation and assigning an executable status to the first operation in response to detecting the incorrect prediction, where the executable status is indicative that the first operation is in the execution path.

In one embodiment, a microprocessor may include a trace cache comprising a plurality of entries, where each entry is configured to store one or more operations; branch prediction logic configured to predict an execution path of a first conditional branch operation stored in an entry of a trace cache; and dispatch logic coupled to the branch prediction logic and to the trace cache. The dispatch logic may be configured to, if a first operation stored in the entry of the trace cache is not in the execution path according to the prediction, assign to the first operation a non-executable status indicative that the first operation is not in the execution path. The dispatch logic may be further configured to detect that the prediction is incorrect subsequent to assigning the non-executable status to the first operation, and to assign an executable status to the first operation in response to detecting the incorrect prediction, where the executable status is indicative that the first operation is in the execution path.

BRIEF DESCRIPTION OF THE DRAWINGS

A better understanding of the present invention can be obtained when the following detailed description is considered in conjunction with the following drawings, in which.

Figure 1:
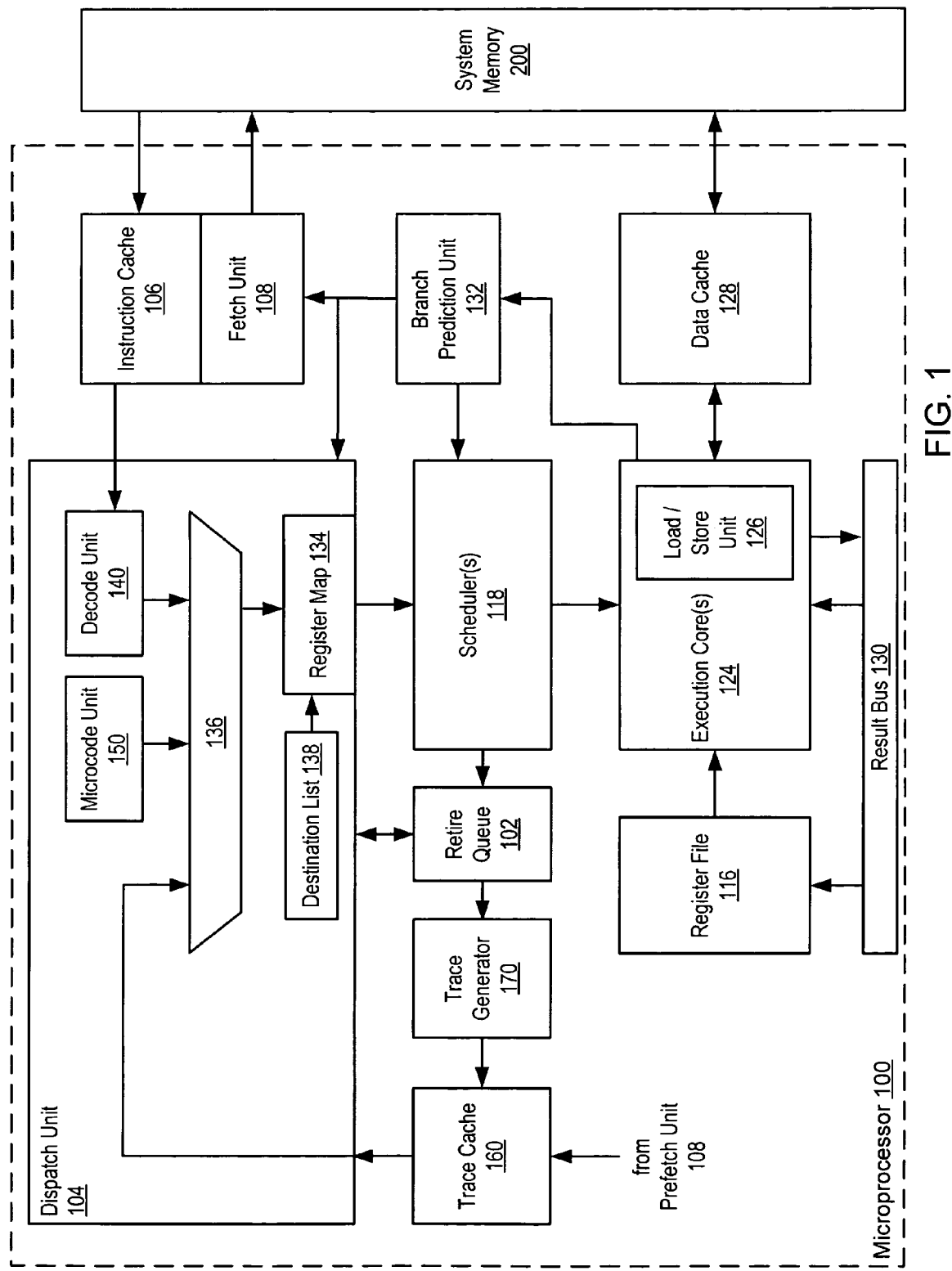
FIG. 1 shows one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

FIG. 1 is a block diagram of logical components included in one embodiment of a microprocessor 100. Microprocessor 100 is configured to execute instructions stored in a system memory 200. Many of these instructions operate on data stored in system memory 200. Note that system memory 200 may be physically distributed throughout a computer system and may be accessed by one or more microprocessors 100. In some embodiments, the microprocessor 100 may be designed to be compatible with the x86 architecture. Note that microprocessor 100 may also include and/or be coupled to many other components in addition to those shown here. For example, additional levels of cache may be included (internal and/or external to microprocessor 100) between microprocessor 100 and system memory 200. Similarly, microprocessor 100 may include a memory controller configured to control system memory 200 in some embodiments. Additionally, the interconnections between logical components may vary between embodiments.

Microprocessor 100 may include an instruction cache 106 and a data cache 128. Microprocessor 100 may include a fetch unit 108 coupled to the system memory 200. Fetch unit 108 may prefetch instruction code from the system memory 200 for storage within instruction cache 106. In one embodiment, fetch unit 108 may be configured to burst code from the system memory 200 into instruction cache 106. Fetch unit 108 may employ a variety of specific code prefetching techniques and algorithms. Fetch unit 108 may also fetch instructions from instruction cache 106 and traces from trace cache 160 into dispatch unit 104. Instructions may be fetched from instruction cache 106 in response to a given instruction address missing in trace cache 160. Likewise, instructions may be fetched from system memory 200 in response to a given address missing in instruction cache 106.

A dispatch unit 104 may be configured to receive instructions from instruction cache 106 and to receive decoded and/or partially decoded operations from trace cache 160. The dispatch unit 104 may include a decode unit 140 to decode instructions received from instruction cache 106 into component operations. The dispatch unit 104 may also include a microcode unit 150 for use when handling microcoded instructions. Operations from the decode unit 140, microcode unit 150, or trace cache 160 may be provided to a register map 134 via multiplexer 136. Register map 134 may further receive information regarding instruction destinations from a destination list 138.

As used herein, the term "instruction" is used to describe non-decoded instructions fetched from instruction cache 106. For example, an instruction may be an x86 instruction. "Operation" refers to a decoded instruction (e.g., a macroOP) that is in a format executable within the processor. A decode unit 140 may be used to decode each instruction fetched from instruction cache 106 into one or more less complex operations. Note that in some embodiments, instructions and operations may be substantially the same.

The dispatch unit 104 is configured to dispatch operations to scheduler(s) 118. One or more schedulers 118 may be coupled to receive dispatched operations from dispatch unit 104 and to issue operations to one or more execution cores 124. Execution core(s) 124 may include a load/store unit 126 configured to perform accesses to data cache 128. Results generated by execution core(s) 124 may be output to a result bus 130. These results may be used as operand values for subsequently issued instructions and/or stored to register file 116. A retire queue 102 may be coupled to scheduler(s) 118 and dispatch unit 104. The retire queue may be configured to determine when each issued operation may be retired.

Instruction cache 106 may temporarily store instructions prior to their receipt by dispatch unit 104. Instruction code may be provided to instruction cache 106 by prefetching code from the system memory 200 through fetch unit 108. Instruction cache 106 may be implemented in various configurations (e.g., set-associative, fully-associative, or direct-mapped).

Dispatch unit 104 may output signals including bit-encoded operations executable by the execution core(s) 124 as well as operand address information, immediate data and/or displacement data. Decode unit 140 may be used to decode certain instructions into one or more operations executable within execution core(s) 124. Simple instructions may correspond to a single operation. More complex instructions may correspond to multiple operations. Upon receiving an operation that involves the update of a register, the dispatch unit 104 may reserve a register location within register file 116 to store speculative register states (in an alternative embodiment, a reorder buffer may be used to store one or more speculative register states for each register). A register map 134 may translate logical register names of source and result operands to physical register names in order to facilitate register renaming. Register map 134 may track which registers within register file 116 are currently allocated and unallocated. As described in greater detail below, destination list 138 may be configured to store a list of the destination registers of unretired operations. When an operation transitions from non-executable to executable or vice versa, destination list 138 may identify the corresponding destination register to register map 134 so that register map 134 may track the change in usage of the destination register.

Dispatch unit 104 may include a microcode unit 150. Microcode unit 150 may handle microcoded instructions detected within the instruction stream input to dispatch unit 104. Microcode unit 150 may include and/or be coupled to a ROM (Read Only Memory) that stores microcode routines corresponding to each microcoded instruction. Decode unit 140 may handle microcode entry point generation. Different microcoded instructions may require differing numbers of microcode operations to effect their corresponding functions. Additionally, the number of microcode operations corresponding to a particular MROM instruction may vary according to the addressing mode of the instruction, the operand values, and/or the options included with the instruction. The microcode unit 150 may dispatch the microcode operations to one or more schedulers 118. The microcode operations are thereafter issued and executed in a similar fashion to other decoded operations. It is noted that the microcode operations may be defined within the instruction set, or may be customized for the particular microprocessor on which they are to execute. In some embodiments, microcode operations may be stored in microcode traces within a ROM.

When operations are handled by dispatch unit 104, if a required operand is a register location, register address information may be routed to register map 134 (or a reorder buffer). For example, in the x86 architecture, there are eight 32-bit logical registers (e.g., EAX, EBX, ECX, EDX, EBP, ESI, EDI and ESP). Physical register file 116 (or a reorder buffer) includes storage for results that change the contents of these logical registers, allowing out of order execution. A physical register in register file 116 may be allocated to store the result of each operation that modifies the contents of one of the logical registers. Therefore, at various points during execution of a particular program, register file 116 (or, in alternative embodiments, a reorder buffer) may have one or more registers that contain the speculatively executed contents of a given logical register.

Register map 134 may assign a physical register to a particular logical register specified as a result operand for an operation. Register file 116 may have one or more previously allocated physical registers assigned to a logical register specified as a source operand in a given operation. The register map 134 may provide a tag for the physical register most recently assigned to that logical register. This tag may be used to access the operand's data value from the register file 116 or to receive the data value via result forwarding on the result bus 130. If the operand corresponds to a memory location, the operand value may be provided on the result bus (for result forwarding and/or storage in register file 116) through load/store unit 222. Operand data values may be provided to execution core(s) 124 when the operation is issued by one of the scheduler(s) 118. Note that in alternative embodiments, operand values may be provided to a corresponding scheduler 118 when an operation is dispatched (instead of being provided to a corresponding execution core 124 when the operation is issued).

The microprocessor 100 of FIG. 1 supports out of order execution. A retire queue 102 (or, alternatively, a reorder buffer) may keep track of the original program sequence for register read and write operations, allow for speculative instruction execution and branch misprediction recovery, and facilitate precise exceptions. In many embodiments, retire queue 102 may function similarly to a reorder buffer. However, unlike a typical reorder buffer, retire queue 102 may not provide any data value storage. In alternative embodiments, retire queue 102 may function more like a reorder buffer and also support register renaming by providing data value storage for speculative register states. In some embodiments, retire queue 102 may be implemented in a first-in-first-out configuration in which operations move to the "bottom" of the buffer as they are validated, thus making room for new entries at the "top" of the queue. As operations are retired, retire queue 102 may deallocate registers in register file 116 that are no longer needed to store speculative register states and provide signals to register map 134 indicating which registers are currently free. By maintaining speculative register states within register file 116 (or, in alternative embodiments, within a reorder buffer) until the operations that generated those states are validated, the results of speculatively-executed operations along a mispredicted path may be invalidated in the register file 116 if a branch prediction is incorrect.

A basic block is a set of operations that begins just after a branch operation and ends with another branch operation, such that if any one of the operations in a basic block is executed, all of the operations in that basic block will be executed. Each trace may include operations that are part of several different basic blocks. Retire queue 102 may provide signals identifying program traces to trace generator 170 (which may also be described as a fill unit). Trace generator 170 may store traces identified by retire queue 102 into trace cache 160. The traces stored into trace cache 160 may include several fully decoded or partially decoded operations. As used herein, a "trace" is a group of operations that are stored within a single trace cache entry in the trace cache 160.

Fetch unit 108 may fetch operations from trace cache 160 into dispatch unit 104. When operations are fetched from the trace cache (as opposed to when instructions are loaded from instruction cache 106), the decode unit 140 may be at least partially bypassed, resulting in a decreased number of dispatch cycles for the cached operations fetched from the trace cache 160. Accordingly, the trace cache 160 may allow the dispatch unit 104 to amortize the time taken to partially (or fully) decode the cached operations in decode unit 140 over several execution iterations if traces are executed more than once.

The decoded operations and immediate data provided at the outputs of dispatch unit 104 may be routed to one or more schedulers 118. Note that as used herein, a scheduler is a device that detects when operations are ready for execution and issues ready operations to one or more execution units. For example, a reservation station is a scheduler. Each scheduler 118 may be capable of holding operation information (e.g., bit encoded execution bits as well as operand values, operand tags, and/or immediate data) for several pending operations awaiting issue to an execution core 124. In some embodiments, each scheduler 118 may not provide operand value storage. Instead, each scheduler may monitor issued operations and results available in register file 116 in order to determine when operand values will be available to be read by execution core(s) 124 (from register file 116 or result bus 130). In some embodiments, each scheduler 118 may be associated with a dedicated execution core 124. In other embodiments, a single scheduler 118 may issue operations to more than one of the execution core(s) 124.

Schedulers 118 may be provided to temporarily store operation information prior to execution of those operations by the execution core(s) 124. Additionally, each scheduler may store operation information for operations that have already been executed but may still reissue. Operations are issued to execution core(s) 124 for execution in response to the values of all required operand(s) being available at the time of execution. Accordingly, the order in which operations are executed may not be the same as the order of the original program instruction sequence. Operations that involve speculation may remain in scheduler(s) 118 until they become non-speculative so that they may be reissued if the speculation is incorrect. Operations may not be retired until it is known that the computed result is correct.

In one embodiment, each of the execution core(s) 124 may include components configured to perform integer arithmetic operations of addition and subtraction, as well as shifts, rotates, logical operations, and branch operations. A floating point unit may also be included to accommodate floating point operations. One or more of the execution core(s) 124 may be configured to perform address generation for load and store memory operations to be performed by load/store unit 126.

The execution core(s) 124 may also provide information regarding the execution of conditional branch instructions to branch prediction unit 132. If information from the execution core 124 indicates that a branch prediction is incorrect, the branch prediction unit 132 may flush instructions subsequent to the mispredicted branch that have entered the instruction processing pipeline and redirect fetch unit 108. The redirected fetch unit 108 may then begin fetching the correct set of instructions from instruction cache 106, trace cache 160, and/or system memory 200. In such situations, the results of instructions in the original program sequence that occurred after the mispredicted branch instruction are discarded, including those which were speculatively executed and temporarily stored in load/store unit 126 and/or register file 116. If the mispredicted operation is included in a trace read from trace cache 160 (i.e., a mispredicting trace), the branch prediction unit 132 may flush instructions subsequent to the mispredicted branch as described in more detail below. Further, branch prediction unit 132 may communicate the misprediction to dispatch unit 104, which may use the misprediction information to transition the executable status of operations in the mispredicting trace as described in greater detail below.

Results produced by components within execution core(s) 124 may be output on the result bus 130 to the register file 116 if a register value is being updated. If the contents of a memory location are being changed, the results produced within execution core(s) 124 may be provided to the load/store unit 126.

Load/store unit 126 provides an interface between execution core(s) 124 and data cache 128. In one embodiment, load/store unit 126 may be configured with a load/store buffer with several storage locations for data and address information corresponding to pending loads or stores. The load/store unit 126 may also perform dependency checking for load instructions against pending store instructions to ensure that data coherency is maintained.

Data cache 128 is a cache memory provided to temporarily store data being transferred between load/store unit 126 and the system memory 200. Like the instruction cache 106 described above, the data cache 128 may be implemented in a variety of specific memory configurations, including a set associative configuration. Additionally, data cache 106 and instruction cache 128 may be implemented in a unified cache in some embodiments.

Identification of Liveness Groups within a Trace

Figure 2A:
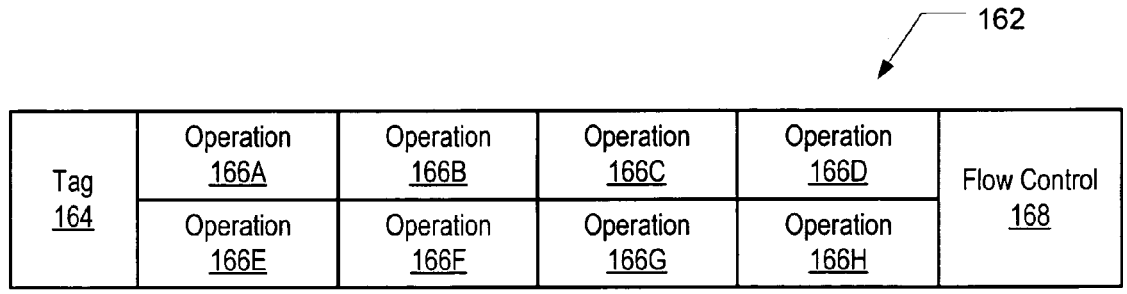
FIG. 2A illustrates an exemplary trace cache entry, according to one embodiment.

Trace cache 160 shown in FIG. 1 includes several trace cache entries. Each trace cache entry may store a group of operations referred to as a trace. As used herein, a "trace" is a group of information that includes a unique label (such as tag 164 below) identifying the remaining information, several containers for semantic operations, several addresses identifying successor traces in the trace cache and/or instructions in the instruction cache, and flow control information. FIG. 2A illustrates one embodiment of a trace. In the embodiment of FIG. 2A, a trace cache entry 162 may store up to eight decoded and/or partially decoded operations in operation storage units 166A–166H. Throughout this disclosure, drawing elements identified by the same reference numeral and a unique alphabetic identifier (e.g., operation storage units 166A–166H) may be collectively referred to by that reference numeral alone (e.g., operation storage units 166). Note that other embodiments may include fewer or additional operation storage units 166, allowing storage of a different number of operations within each trace cache entry 162.

Certain operation storage units 166 within a trace cache entry 162 may be reserved for certain types of operations. For example, in one embodiment, operation storage units 166A–166D may be used to contain memory operations. Similarly, operation storage units 166E–166H may be used to contain data operations. Note that other embodiments may associate certain types of operations with certain operation storage units differently (or not at all). Operations may be stored in operation storage units 166 in such a way that the data flow order between operations in the same trace cache entry 162 is readily apparent from the register dependencies between operations.

In addition to including several operation storage units 166, each trace cache entry 162 also includes an identifying tag 164 and flow control information 168. Tag 164 may be similar to a tag in instruction cache 106, allowing fetch unit 108 to determine whether a given operation hits or misses in trace cache 160. For example, tag 164 may include all or some of the address bits identifying an operation within the trace cache entry (e.g., the tag may include the address of the earliest operation, in program order, stored within that trace). In some embodiments, the tag 164 may include enough information that multiple operations (or at least the first operation within each liveness group) may be independently addressable within a trace. For example, the tag 164 may provide a fetch address for the first operation, in program order, within each liveness group in the trace, allowing each different liveness group to be associated with a different fetch address. In other embodiments, only the first operation within a trace may be uniquely addressable. Thus, in some embodiments, a tag 164 may provide a means for associating multiple instructions with a single starting fetch address (e.g., the fetch address of the first operation, in program order, within the trace).

In the illustrated embodiment, each trace may include up to two conditional branch operations. Other embodiments may include fewer or additional branch operations (conditional or unconditional) within each trace. Flow control information 168 may include a target label for each conditional branch operation included within the trace. The target label may be an indication identifying the address to which control should transfer depending on the resolution (taken, not taken) of a respective conditional branch in the trace. Thus, each item of flow control information 168 may be associated with a particular conditional branch operation in the trace. For example, in one embodiment, one flow control information storage location within a trace may be associated with the first conditional branch operation in the trace and the other flow control information storage location may be associated with the second conditional branch in the trace. Alternatively, the flow control information may include tags or other information identifying the branch operation with which that flow control information is associated. In yet other embodiments, a branch prediction and/or information identifying which flow control information corresponds to a branch operation may be stored with that branch operation within operation storage 166. In addition to being obtained from flow control information 168, successor addresses of instructions or traces to which control should flow subsequent to execution of a group of operations in the trace may also be obtained from the top of the call/return stack and the jump indirection table.

Figure 2B:
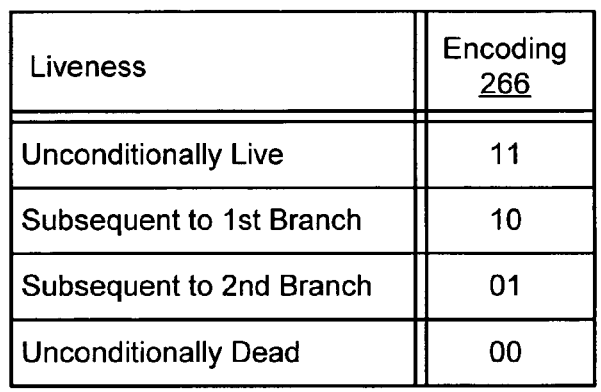
FIG. 2B is a table of liveness encodings that may be used to identify the liveness group in which each operation in a trace belongs, according to one embodiment.
Figure 2C:
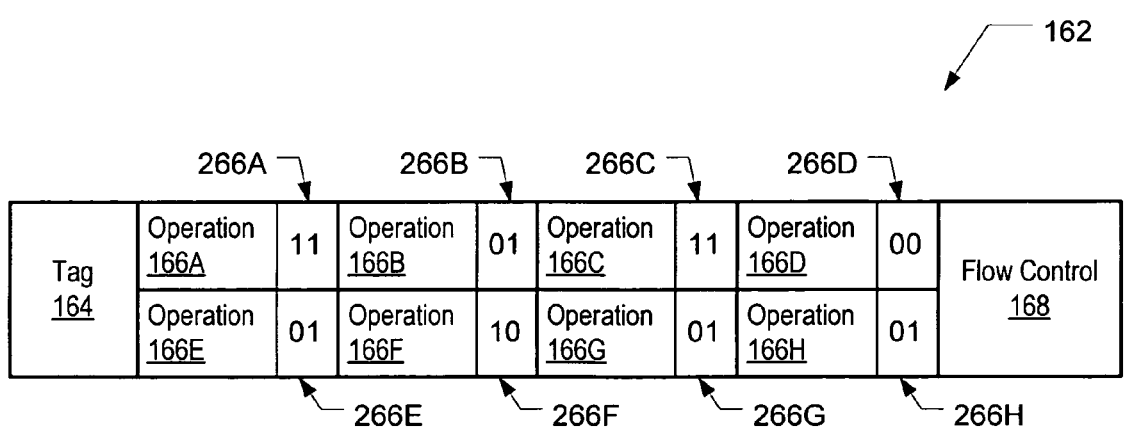
FIG. 2C illustrates an exemplary trace cache entry that includes liveness encodings, according to one embodiment.

Each operation 166 within a trace may have an associated liveness indication 266, as shown in FIG. 2C. Liveness indications 266 provide a means of determining which operations in a given trace come before or after a particular conditional branch operation included in that trace. Each operation's liveness indication 266 may be stored with its associated operation in one of operation storage units 166. Liveness indications 266 identify the liveness group in which each operation belongs. Each liveness group is a set of operations within the trace that are part of the same basic block. For example, the operations up to and including the first branch operation, in program order, within the trace may be included in one liveness group. Operations whose execution is dependent on the resolution of the first branch operation may be included in another liveness group. Thus, a liveness group is similar to a basic block in that operations in the same liveness group will either all be executed or all not be executed. A liveness group differs from a basic block in that operations in the same basic block may be included in different traces (e.g., some operations within the basic block may be included in the final liveness group within one trace and the remaining operations in that basic block may be included in the first liveness group in another trace). Thus, operations within the same liveness group are necessarily part of the same basic block, but operations within the same basic block may not necessarily be part of the same liveness group (i.e., if that basic block spans more than one trace cache entry).

The liveness indications 266 identify each operation's program order relative to the branch operation(s) included in the same trace cache entry. Operations in a first liveness group are not dependent on the outcome of the first branch operation within the trace. Note that since execution of the first branch operation is not conditional, the first branch operation is part of the first liveness group. These operations in the first liveness group may be identified with a different liveness indication than is used to identify a second liveness group of operations that occur after the first branch operation. Similarly, instructions in a third liveness group that depend on the outcomes of both the first branch operation and a second branch operation (i.e., the final operation included in the second liveness group) may be identified with yet another liveness indication. Liveness indications allow operations to be stored within a trace cache entry 162 in an order that differs from their program order while still allowing the program order (relative to the branch operations) of the operations to be determined.

Additionally, liveness indications 266 allow dispatch unit 104 to predict which operations within a particular trace will be executed. Operations in the first liveness group (i.e., operations that are not dependent on the first conditional branch included in a trace) will always be executed (assuming any operations at all within the trace execute). However, execution of operations in the second liveness group (i.e., operations that depend on the first conditional branch) depends on the outcome of the first conditional branch. For example, in embodiments where the trace generator 170 is included at the back-end of the processing pipeline of microprocessor 100, operations may be stored in traces according to the order in which those operations executed so that if the operations are subsequently executed again, they may be accessed from the trace cache instead of from the instruction cache. Thus, if the first conditional branch stored within the trace was taken the first time that branch executed, the operations stored in the second liveness group may be the operations that should be executed if the first conditional branch is taken. Accordingly, if the trace is later provided to dispatch unit 104 and the current branch prediction for the first conditional branch is "not taken," the dispatch unit 104 may predict that the operations in the second liveness group should not be executed. The flow control information 168 associated with the first conditional branch operation may also be used to begin prefetching instructions or traces that should be executed if the first conditional branch is not taken.

FIG. 2B shows exemplary liveness encodings that may be used in one embodiment. The first liveness encoding, "unconditionally live," may be used to identify the first (in program order) liveness group within the trace. Operations in this liveness group are unconditionally live in the sense that, if the trace is executed, these operations will always be executed. The first liveness group may include a conditional branch operation as the final operation (in program order) within that liveness group. These operations are not dependent on any conditional branch operations included within the same trace. In many embodiments, these operations may be stored in any order relative to each other within the trace.

The next liveness encoding, "subsequent to first branch" is used to identify the second (in program order) liveness group within the trace. These operations are dependent on the outcome of the first conditional branch operation, which is included in the previous liveness group. Note that if any operations within this liveness group are non-speculatively executed, all operations within this liveness group will be executed.

The third liveness encoding, "subsequent to second branch" is used to identify the third (in program order) basic block within the trace. These operations are dependent on the outcome of both the first and the second conditional branch operations within the trace. Thus, these operations may not execute even if operations having the second liveness encoding execute. As above, if any operations within this liveness group are non-speculatively executed, all operations within this liveness group will be executed.

The "unconditionally dead" liveness encoding may be used to identify an unused operation storage unit 166. Operation storage units 166 may be unused if more than the maximum number of conditional branch operations occur within a set of operations. For example, if up to eight operations can be stored in a trace and if only two conditional branch operations can be stored in a trace, then fewer than eight operations may be stored in a trace if a given set of eight operations includes three branch operations. Thus, if a maximum limit is placed on the number N of conditional branch operations that may be stored within a trace, storage of the Nth conditional branch operation in the trace may end the trace. Furthermore, in some embodiments, if a certain operation is stored within a trace, subsequent operations (in program order) may not be stored within the trace, even if operation storage is available. For example, subroutine call operations may end a trace (e.g., so that the first operation within the subroutine may be stored as the first operation within another trace, allowing the tag of that operation to be used as a trace tag). Similarly, subroutine return operations may end a trace.

Additionally, in some embodiments, the presence of the "unconditionally dead" liveness encoding in an operation storage unit may indicate that additional bits for use with another operation in the trace may be stored within that operation storage unit. This may allow reduced operation storage unit size in some embodiments. For example, in one embodiment, the lower four operation storage units 166E–166H may be used to contain data operations. Each data operation storage unit 166E–166H may include storage for eight bits of immediate data. If a data operation included in the trace has more than eight bits of immediate data, the additional immediate data bits may be stored in one of the upper operation storage units 166A–166D. In one embodiment, operation storage units may be vertically linked (e.g., operation storage units 166A and 166E may be linked and so on) such that if one of the upper operation storage units has an "unconditionally dead" liveness indication, it indicates that upper operation storage unit may be storing additional information for its linked lower operation storage unit. Note that "upper" and "lower" describe an illustrative relationship and do not necessarily describe a physical relationship between operation storage units.

FIG. 2C illustrates how operations may be stored in an unordered fashion within a trace cache entry 162. Each operation's associated liveness indication 266 is encoded using one of the encodings of FIG. 2B. The exemplary arrangement of liveness indications illustrates how operations from different liveness groups may be stored adjacently within a trace cache entry 162. Thus, the liveness indications allow operations to be reordered and/or combined within a trace. This in turn may allow operations to be stored within the trace more efficiently, such that more operations can be stored in a trace cache entry 162 of a given size than would be possible without the use of liveness indications.

Looking back at FIG. 1, trace generator 170 may be configured to generate the appropriate liveness encoding for each operation and to store that liveness encoding within the same operation storage unit 166 as the operation within a trace in trace cache 160. Trace generator 170 may generate liveness encodings for each operation based on information about the outcome of each branch the first time each branch operation was executed. This information may be provided from retire queue 102. Additional information may be provided from branch prediction unit 132 identifying the predicted outcome and/or the success of each prediction for each branch in one or more prior executions.

Figure 3:
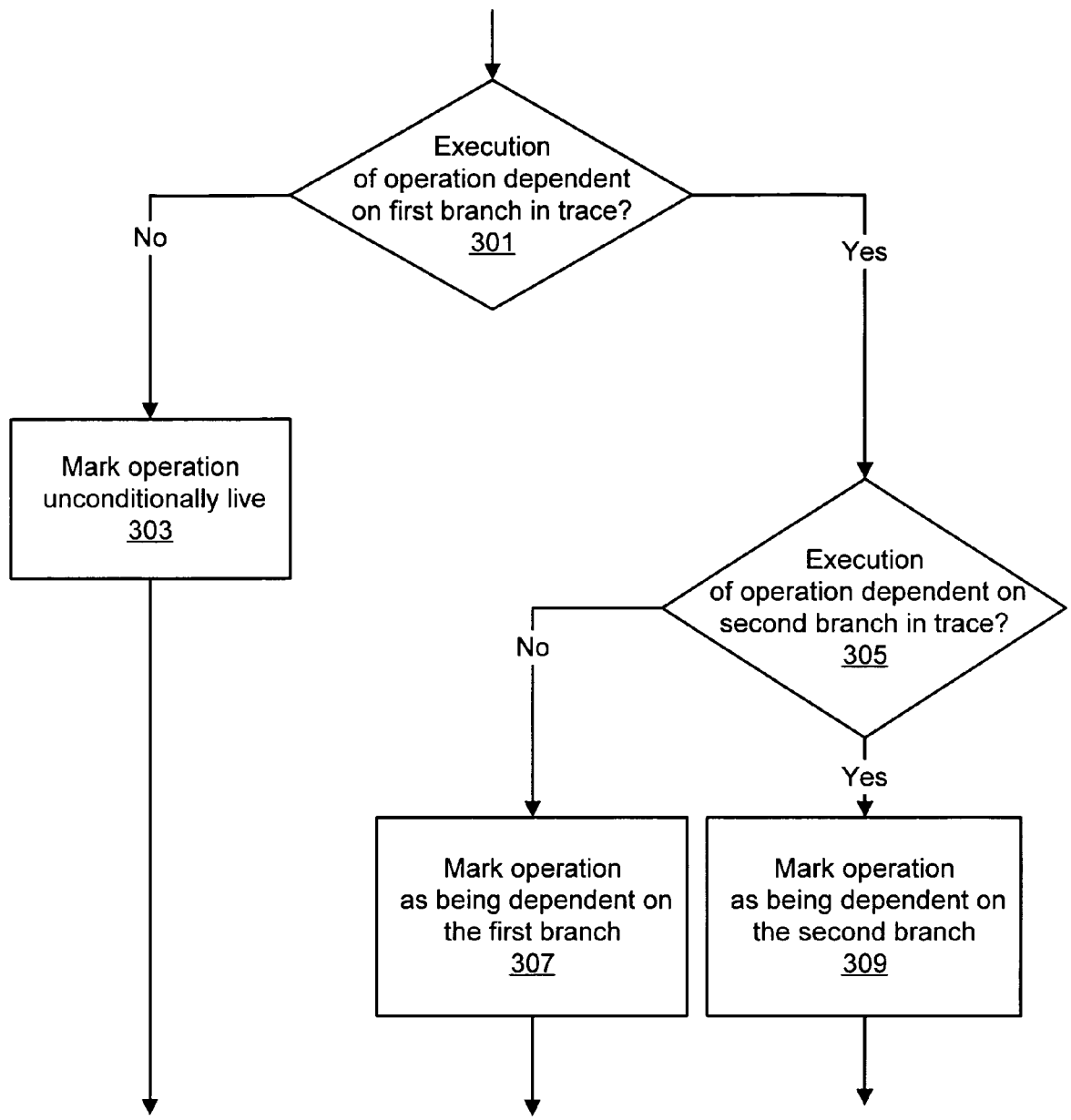
FIG. 3 is a flowchart illustrating a method of generating liveness encodings, according to one embodiment.

FIG. 3 is a flow chart illustrating one embodiment of a method that may be used to generate the liveness encoding for each operation within a trace. If execution of the operation does not depend on the first conditional branch (i.e., if the operation occurs earlier than the first conditional branch in program order or if the operation is the first conditional branch), then the operation may be marked as an unconditionally live operation within the trace cache entry, as shown at 301 and 303.

If execution of the operation is dependent on the first conditional branch but not on the second conditional branch (if any) in the trace, then the operation may be identified as being dependent on the first conditional branch, as shown at 305 and 307. If the operation is dependent on both the first and the second conditional branches, the operation may be identified as being dependent on the second conditional branch, as indicated at 305 and 309. If more basic blocks may be stored within a trace, additional liveness indications (e.g., conditioned on the third conditional branch, etc.) may be generated and stored with the appropriate operations in the trace cache.

Looking back at FIG. 1, dispatch unit 104 may be configured to use the liveness indications 266 included in each operation storage unit 166 to determine which operations should be dispatched to scheduler(s) 118 for subsequent issue to execution core(s) 124 each time the operations included in a trace cache entry 162 are loaded into dispatch unit 104 from trace cache 160. Dispatch unit 104 may dispatch each operation included in the trace while also identifying each operation as being executable or not executable dependent on its liveness indication and the current conditional branch prediction for the first conditional branch operation included in the trace. In such embodiments, scheduler 118 may maintain an indication as to whether each operation is executable within scheduler 118. Scheduler 118 may be configured to only issue operations that are identified as being executable to execution core 124. Alternatively, dispatch unit 104 may use a current branch prediction from branch prediction unit 132 for each branch operation included in the trace in conjunction with the liveness indications to determine which operations should be dispatched for subsequent issue and to dispatch only those operations identified as executable.

Figure 4:
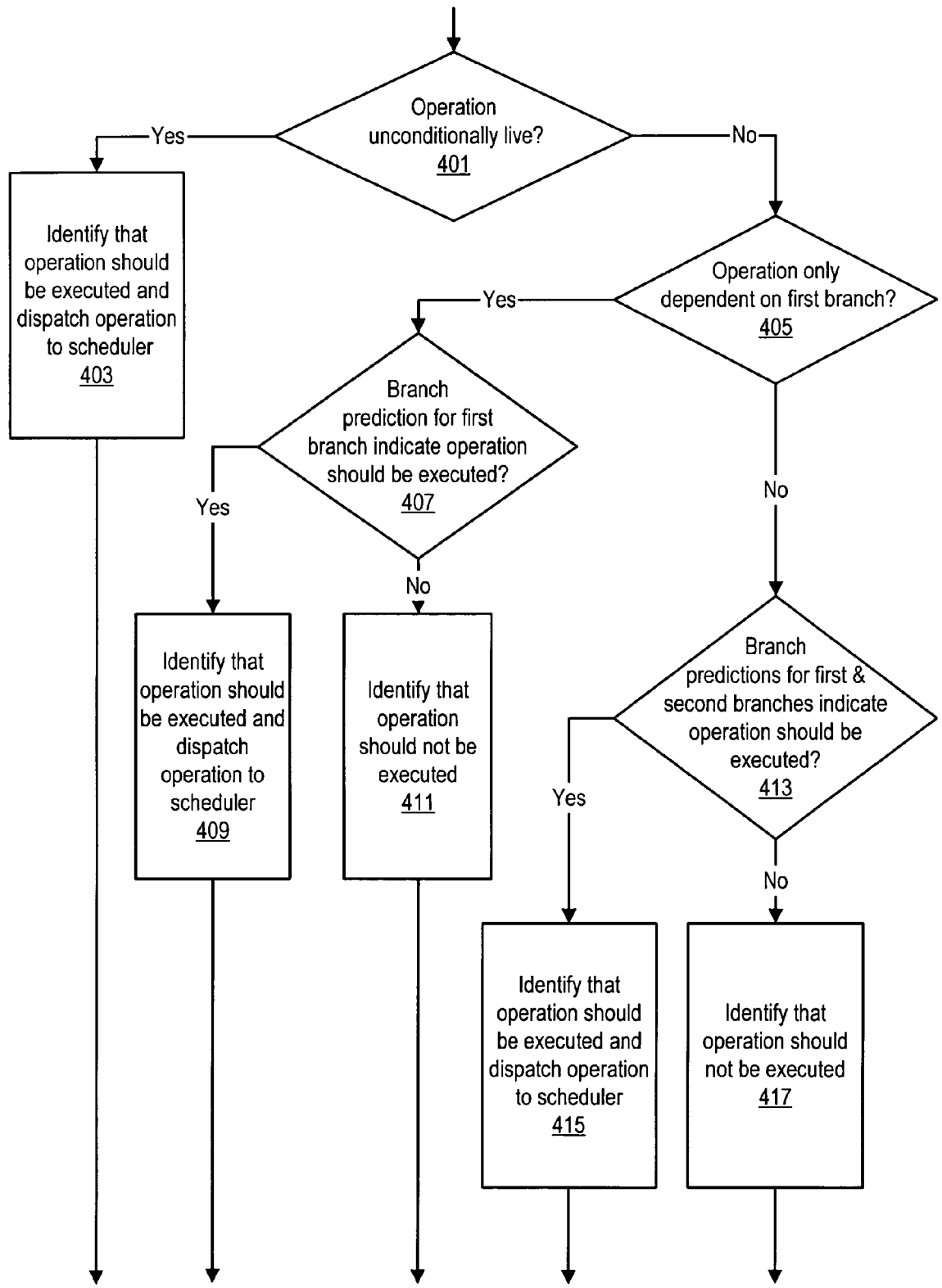
FIG. 4 is a flowchart of a method of using liveness encodings and branch predictions to determine which operations should be executed, according to one embodiment.

FIG. 4 illustrates one embodiment of a method of determining whether an operation included in a trace is executable. If the operation is unconditionally live (i.e., the operation is part of the first basic block within the trace), the operation may be identified as being executable and dispatched to the scheduler, as indicated at 401 and 403. Additionally, in some embodiments, the operation may be marked within the scheduler as an operation to be executed. Marking the operation as executable may allow the scheduler to store both operations that are executable and operations that are not currently identified as executable (e.g., based on a current conditional branch prediction). In such an embodiment, the dispatch unit 104 may provide a signal to the scheduler 118 when the operation is dispatched to indicate that the operation should be marked executable within the scheduler. Note that identifying an operation within a scheduler as executable, which is based on a conditional branch prediction, differs from identifying an operation within the scheduler ready to issue, which is based on operand availability for that operation. As described in greater detail below, marking an operation as executable or non-executable within scheduler 118 may improve performance upon branch mispredictions by allowing some operations to reissue directly from scheduler 118 without being redispatched from dispatch unit 104.

If the operation is only dependent on the first conditional branch (as indicated by the operation's liveness indication) and the branch prediction for the first conditional branch operation indicates that the operation should be executed, the operation may be identified as being executable and dispatched to the scheduler, as shown at 405, 407, and 409. As above, the operation may also be marked within the scheduler as being executable in some embodiments. If instead the branch prediction indicates that the operation should not be executed (e.g., if the current branch prediction differs from the predicted outcome of the first branch at the time the trace was created), the operation may be identified as being non-executable, as indicated at 407 and 411. In one embodiment, the dispatch unit may dispatch operations identified as non-executable to the scheduler while also generating a signal indicating that the operation is non-executable when the operation is dispatched. In response to the signal, the scheduler may mark the operation as non-executable. In other embodiments, the dispatch unit may not dispatch an operation to the scheduler in response to identifying an operation as non-executable.

If the operation is dependent on both the first conditional branch and the second conditional branch (as determined at 405 by examining the operation's liveness indication), the current branch predictions for the first and second conditional branches may be examined at 413 in order to determine whether the operation is executable. If both branch predictions indicate that the operation should be executed (e.g., the current branch predictions are the same as the branch predictions when the operation's trace was created), the operation may be identified as executable and dispatched to the scheduler, as indicated at 415. Dispatching the operation to the scheduler may, in some embodiments, involve generating a signal indicating that the operation is executable so that the scheduler can mark the operation as being executable. If the current branch predictions indicate that the operation should not be executed, the operation may be identified as being non-executable at 417.

Returning to FIG. 1, note that in some embodiments, operations that dispatch unit 104 identifies as non-executable based on one or more branch predictions and the operations' liveness indications may also be dispatched to scheduler(s) 118. However, these operations may be marked within the scheduler as being non-executable. Accordingly, entries within each scheduler 118 may each include storage for an "executable" indication that indicates whether the operation stored within that entry should be issued to one of execution core(s) 124 or not. Scheduler(s) 118 may be configured to store non-executable operations until all of the executable operations within that trace are retired. Operations within the same trace may also be identified within the scheduler. The scheduler 118 may be configured to retire the operations within a particular trace in response to all operations within that trace that are marked as being executable having successfully executed. When the executable operations are retired, scheduler 118 may deallocate scheduler entries allocated to those operations. Additionally, scheduler 118 may also deallocate scheduler entries allocated to the operations within that trace that are identified as being non-executable.

If a branch prediction used to determine that a liveness group was non-executable turns out to be incorrect, the branch prediction unit 132 (or the scheduler 118 itself) may update the executable indications within scheduler(s) 118 to indicate that the liveness group is now executable. In some embodiments, a branch misprediction may also cause the branch prediction as reflected in scheduler 118 to be altered to reflect the true direction of the branch and its true target. For example, following a misprediction, a formerly predicted-taken conditional branch stored in scheduler 118 may be predicted not-taken, or vice versa.

After a mispredicted conditional branch is detected, any operations executed or executing in the mispredicted path may be flushed from the processing pipeline and their results may be discarded. Since some operations in the correct path (e.g., some operations marked non-executable in the mispredicting trace) may already be stored within scheduler 118, the scheduler may begin issuing those operations as soon as their executable indications are updated, rather than waiting for those operations to be refetched and redispatched from dispatch unit 104. Accordingly, branch misprediction recovery may take fewer cycles than if the operations in the correct path were fetched from trace cache 160 or instruction cache 106.

It is noted that in some embodiments, a given operation and thus its executable status may depend on more than one conditional branch. In some such embodiments, whether a non-executable operation in the path of a first mispredicted conditional branch becomes executable upon detection of misprediction of that first branch depends on the predictions of any other intervening conditional branches. Specifically, in one such embodiment, for a non-executable operation to transition to executable following a branch misprediction, the non-executable operation may be required to be in the predicted execution path of each intervening conditional branch between the non-executable operation and the mispredicted branch. Conversely, an executable operation may transition to non-executable following a branch misprediction of any of the conditional branches on which it depends.

If a non-executable operation within scheduler 118 is updated to indicate that it is executable (or vice versa) in response to a branch misprediction, register mappings for subsequent operations as reflected in register map 134 may need to be altered to reflect the effects of the newly executable (or non-executable) operation. For example, two sequential traces may contain the following instructions prior to mapping of logical to physical registers:

| Trace1: | MOV EBX, EAX |
| | JZ SKIP |
| | ADD EBX, EBX |
| Trace2: SKIP: SUB ECX, EBX | |

In this example, the conditional branch JZ is predicted taken, and the ADD operation is consequently indicated as non-executable. In one instance, register map 134 may assign physical registers to the logical registers specified in these two traces as follows:

| Trace1: | MOV PR2, PR1 |
| | JZ SKIP |
| | ADD EBX, EBX; no assignment, not executable |
| Trace2: SKIP: SUB PR3, PR3, PR2 | |

Since the ADD instruction is indicated as non-executable, register map 134 may not assign physical registers to its operands. The assignment of physical registers reflects the data flow of the result of the MOV operation directly to the SUB operation.

During execution of Trace1, a misprediction of the conditional branch JZ may be detected. In this case, scheduler 118 may update the status of the ADD operation to reflect that it is executable. However, the current physical register assignment does not correctly reflect the dependency of the SUB operation on the newly executable ADD operation. Consequently, if the SUB operation has been dispatched to scheduler 118 at the time of the misprediction detection, it may be flushed (along with other operations dispatched after the mispredicted conditional branch, in some embodiments) and redispatched. Further, register map 134 may create a new physical register assignment reflecting the additional update of the EBX logical register by the now-executable ADD operation. In one instance, register map 134 may reassign physical registers to the logical registers specified in these two traces following a branch misprediction as follows:

| Trace1: | MOV PR2, PR1 |
| | JZ SKIP |
| | ADD PR4, PR2, PR2; new assignment |
| Trace2: SKIP: SUB PR3, PR3, PR4 | |

This physical register assignment reflects the result of the MOV operation passing to the ADD operation, and the ADD result passing in turn to the SUB operation, which is consistent with the transition of the ADD operation to executable status. It is noted that transitioning an operation to a non-executable status may involve a similar reassignment of physical registers to logical registers, as may be illustrated by reversing the order of the above physical register assignment examples.

In one embodiment, destination list 138 may be configured to store a list of the logical register destinations of each unretired operation. When a given operation's executable status changes in scheduler 118 (e.g., from non-executable to executable or vice versa), destination list 138 may provide the logical register corresponding to the given operation's destination to register map 134, which may responsively allocate a new physical register mapping (if the given operation is becoming executable) or deallocate an existing physical register mapping (if the given operation is becoming non-executable) for that logical register. Destination list 138 may thereby facilitate the updating of register map 134 following a branch misprediction.

Figure 5:
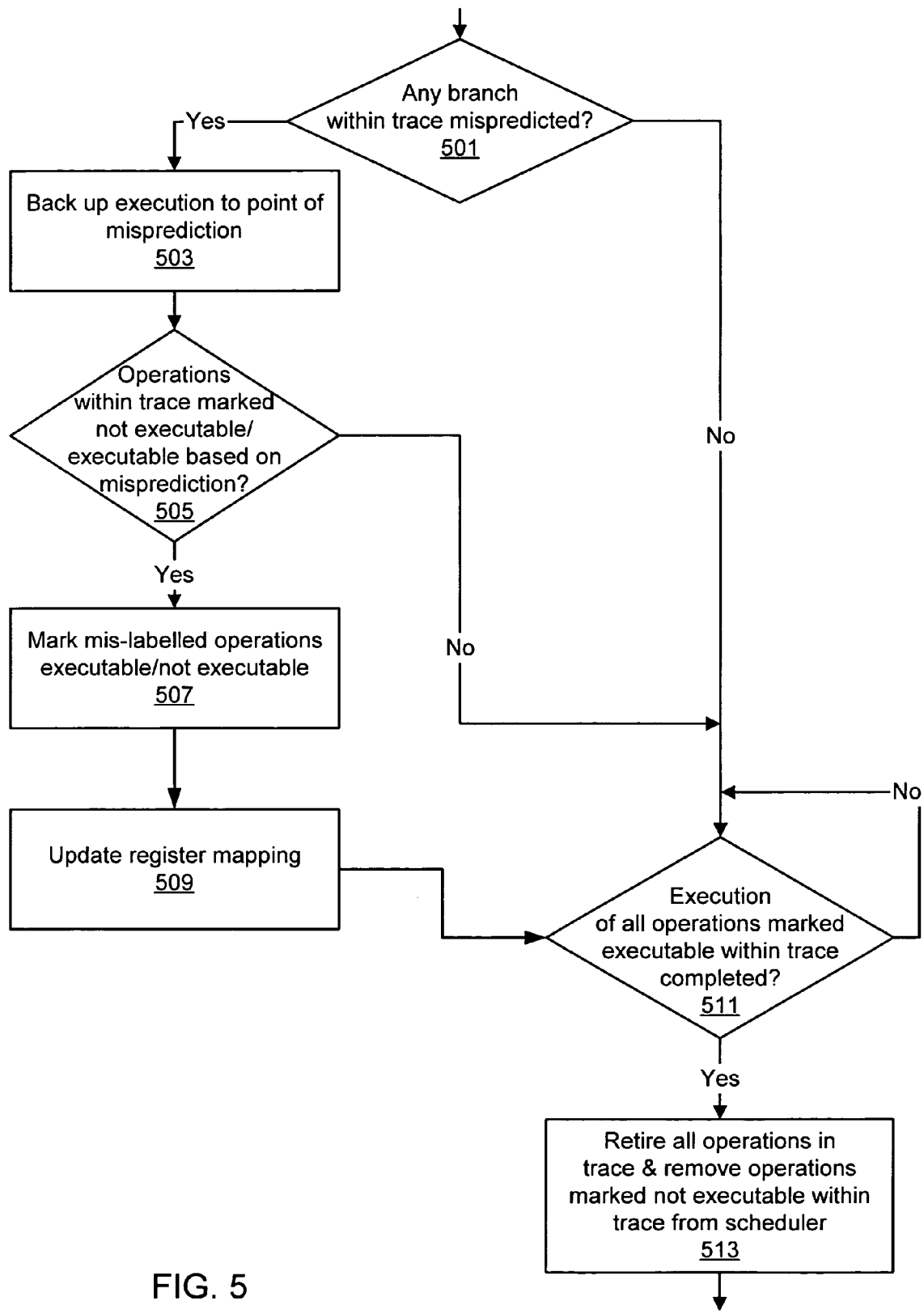
FIG. 5 is a flowchart of a method of executing operations within a trace, according to one embodiment.

FIG. 5 illustrates one embodiment of a method of using the executable indications to recover from a branch misprediction. If any branch within a dispatched trace is discovered to be mispredicted, as determined at 501, execution may be backed up to the point at which the misprediction was made, as shown at 503. If any operations within the same trace as the mispredicted branch instruction were identified as being not executable or executable within the scheduler due to the misprediction, these operations may be relabeled as executable or non-executable instructions, respectively, as indicated at 507. Following relabeling, the mapping of logical to physical registers may be updated, as indicated at 509. In one embodiment, updating the register mapping may include looking up a relabeled operation in a destination list and providing the resulting destination to a register map, as described above. Following the update of the register mapping, the relabeled instructions may be issued for execution.

Once all of the operations marked executable within the trace have been executed, the operations may be retired, as indicated at 511–513. Any operations included in the trace that were identified as being not executable may be removed from the scheduler. If no branch mispredictions were encountered during execution of the trace, the operations retired at 509 may be the same operations that were identified as being executable upon dispatch of the trace. If any branch mispredictions were encountered at 501, the operations retired at 509 may include operations that were originally marked non-executable but updated at 507 in response to detection of the misprediction.

Thus, in embodiments where all operations within a trace, whether determined to be executable or not at dispatch, are kept in the scheduler until all operations in the trace have executed, the operations along the correct path may already be stored inside the scheduler when a misprediction is detected. Accordingly, branch misprediction recovery time may be less than if operations along the correct path have to be fetched from the instruction cache.

Exemplary Computer Systems

Figure 6:
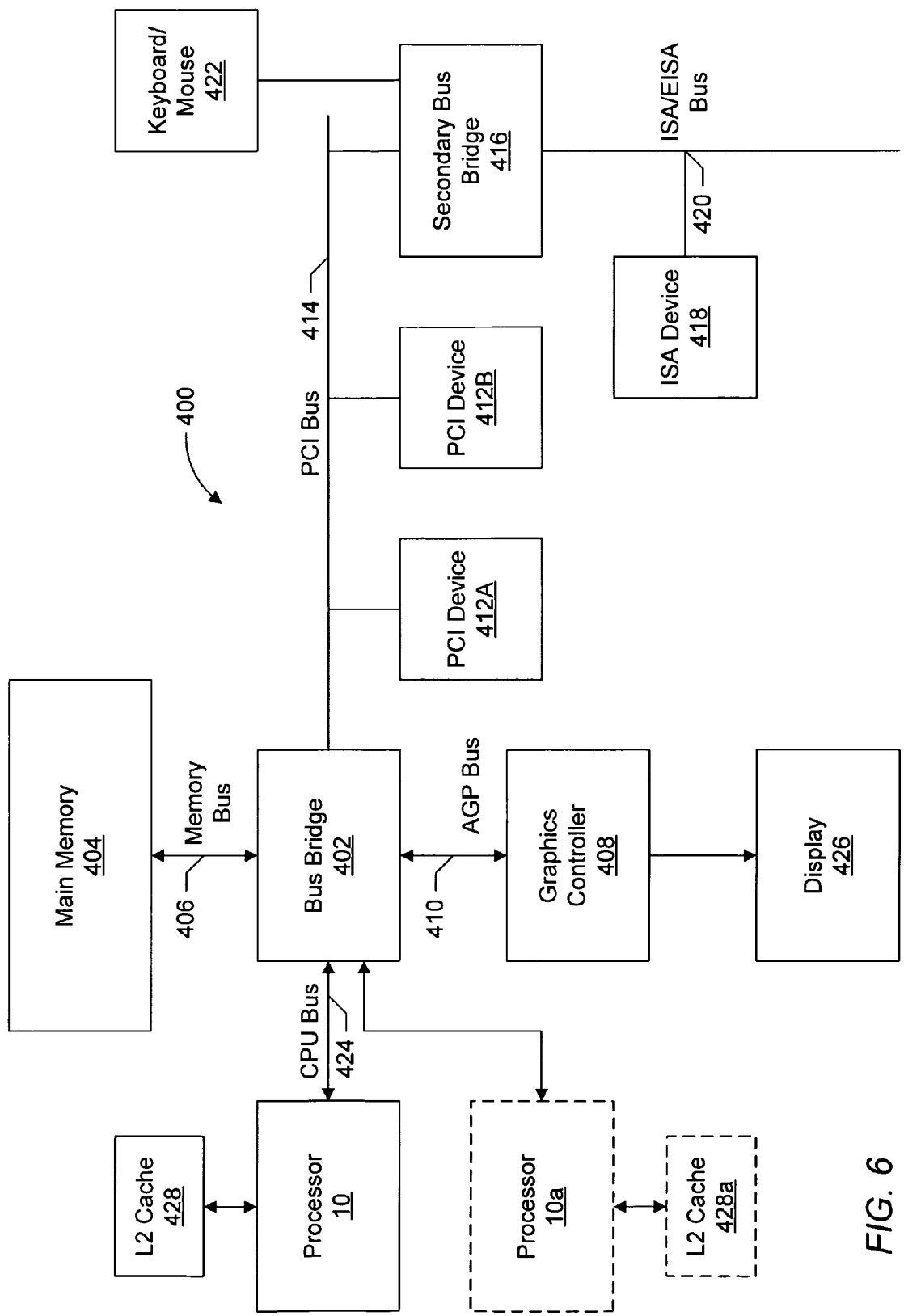
FIG. 6 shows one embodiment of a computer system.

FIG. 6 shows a block diagram of one embodiment of a computer system 400 that includes a microprocessor 100 coupled to a variety of system components through a bus bridge 402. Microprocessor 100 may include an embodiment of a dispatch unit 104, a trace cache 160, a microcode unit 150, and/or a trace cache generator 170 as described above. Other embodiments of a computer system are possible and contemplated. In the depicted system, a main memory 200 is coupled to bus bridge 402 through a memory bus 406, and a graphics controller 408 is coupled to bus bridge 402 through an AGP bus 410. Several PCI devices 412A–412B are coupled to bus bridge 402 through a PCI bus 414. A secondary bus bridge 416 may also be provided to accommodate an electrical interface to one or more EISA or ISA devices 418 through an EISA/ISA bus 420. In this example, microprocessor 100 is coupled to bus bridge 402 through a CPU bus 424 and to an optional L2 cache 428. In some embodiments, the microprocessor 100 may include an integrated L1 cache (not shown).

Bus bridge 402 provides an interface between microprocessor 100, main memory 404, graphics controller 408, and devices attached to PCI bus 414. When an operation is received from one of the devices connected to bus bridge 402, bus bridge 402 identifies the target of the operation (e.g., a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may incorporate additional functionality. An input/output controller (not shown), either external from or integrated with secondary bus bridge 416, may also be included within computer system 400 to provide operational support for a keyboard and mouse 422 and for various serial and parallel ports. An external cache unit (not shown) may also be coupled to CPU bus 424 between microprocessor 100 and bus bridge 402 in other embodiments. Alternatively, the external cache may be coupled to bus bridge 402 and cache control logic for the external cache may be integrated into bus bridge 402. L2 cache 428 is shown in a backside configuration to microprocessor 100. It is noted that L2 cache 428 may be separate from microprocessor 100, integrated into a cartridge (e.g., slot 1 or slot A) with microprocessor 100, or even integrated onto a semiconductor substrate with microprocessor 100.

Main memory 200 is a memory in which application programs are stored and from which microprocessor 100 primarily executes. A suitable main memory 200 may include DRAM (Dynamic Random Access Memory). For example, a plurality of banks of SDRAM (Synchronous DRAM) or Rambus DRAM (RDRAM) may be suitable.

PCI devices 412A–412B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures that can be effectively shifted into and from main memory 200. Graphics controller 408 may therefore be a master of AGP bus 410 in that it can request and receive access to a target interface within bus bridge 402 to thereby obtain access to main memory 200. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional microprocessors (e.g., microprocessor 100a shown as an optional component of computer system 400). Microprocessor 100a may be similar to microprocessor 100. More particularly, microprocessor 100a may be an identical copy of microprocessor 100 in one embodiment. Microprocessor 100a may be connected to bus bridge 402 via an independent bus (as shown in FIG. 15) or may share CPU bus 224 with processor 100. Furthermore, microprocessor 100a may be coupled to an optional L2 cache 428a similar to L2 cache 428.

Figure 7:
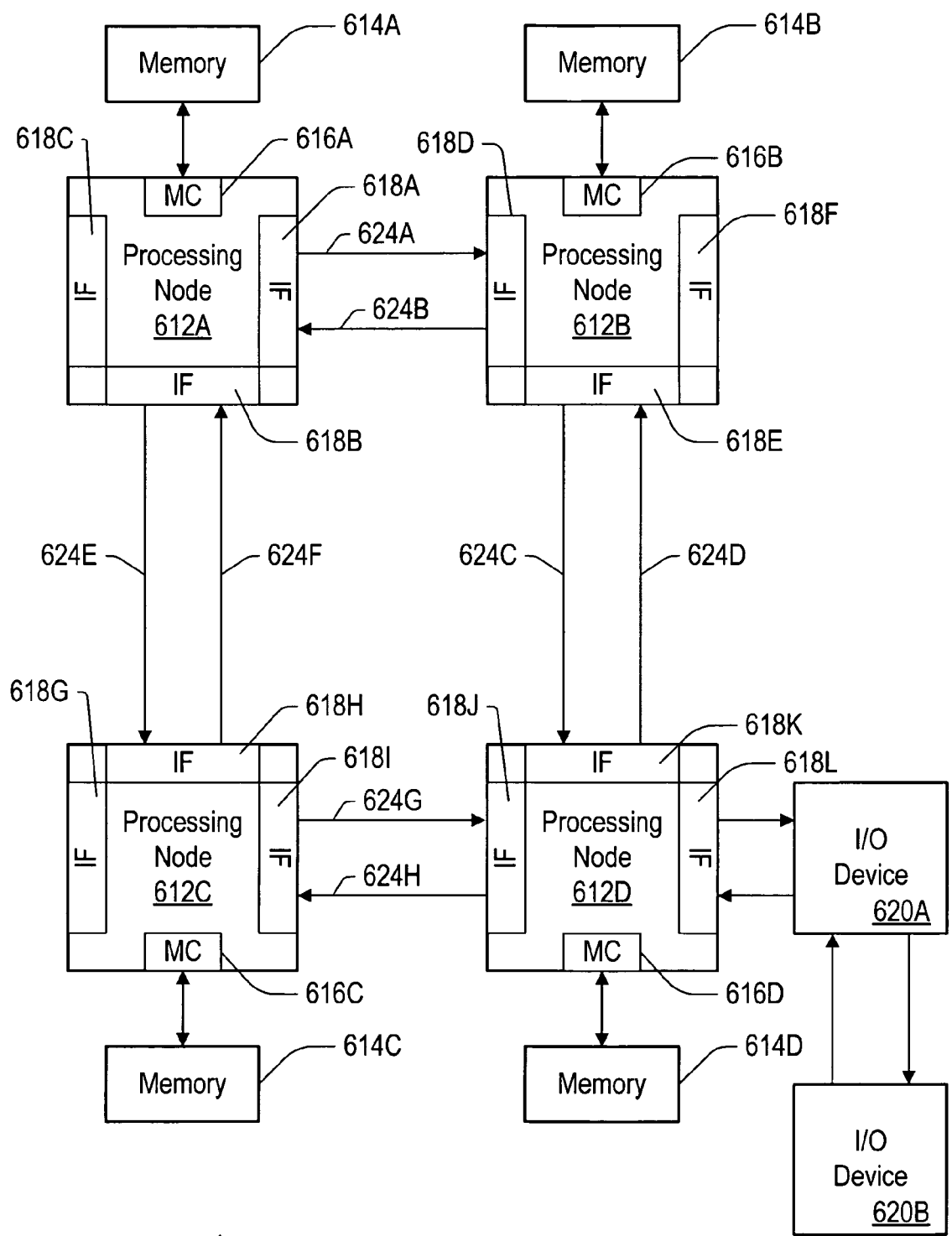
FIG. 7 shows another embodiment of a computer system.

Turning now to FIG. 7, another embodiment of a computer system 400 that may include a dispatch unit 104, a trace cache 160, a microcode unit 150, and/or a trace cache generator 170 as described above is shown. Other embodiments are possible and contemplated. In the embodiment of FIG. 16, computer system 400 includes several processing nodes 612A, 612B, 612C, and 612D. Each processing node is coupled to a respective memory 614A–614D via a memory controller 616A–616D included within each respective processing node 612A–612D. Additionally, processing nodes 612A–612D include interface logic used to communicate between the processing nodes 612A–612D. For example, processing node 612A includes interface logic 618A for communicating with processing node 612B, interface logic 618B for communicating with processing node 612C, and a third interface logic 618C for communicating with yet another processing node (not shown). Similarly, processing node 612B includes interface logic 618D, 618E, and 618F; processing node 612C includes interface logic 618G, 618H, and 618I; and processing node 612D includes interface logic 618J, 618K, and 618L. Processing node 612D is coupled to communicate with a plurality of input/output devices (e.g., devices 620A–620B in a daisy chain configuration) via interface logic 618L. Other processing nodes may communicate with other I/O devices in a similar fashion.

Processing nodes 612A–612D implement a packet-based link for inter-processing node communication. In the present embodiment, the link is implemented as sets of unidirectional lines (e.g., lines 624A are used to transmit packets from processing node 612A to processing node 612B and lines 624B are used to transmit packets from processing node 612B to processing node 612A). Other sets of lines 624C–624H are used to transmit packets between other processing nodes as illustrated in FIG. 16. Generally, each set of lines 624 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 612A to processing node 612D may pass through either processing node 612B or processing node 612C as shown in FIG. 16. Any suitable routing algorithm may be used. Other embodiments of computer system 400 may include more or fewer processing nodes then the embodiment shown in FIG. 16.

Generally, the packets may be transmitted as one or more bit times on the lines 624 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 612A–612D, in addition to a memory controller and interface logic, may include one or more microprocessors. Broadly speaking, a processing node includes at least one microprocessor and may optionally include a memory controller for communicating with a memory and other logic as desired. More particularly, each processing node 612A–612D may include one or more copies of microprocessor 100. External interface unit 18 may includes the interface logic 618 within the node, as well as the memory controller 616.

Memories 614A–614D may include any suitable memory devices. For example, a memory 614A–614D may include one or more RAMBUS DRAMs (RDRAMs), synchronous DRAMs (SDRAMs), static RAM, etc. The address space of computer system 400 is divided among memories 614A–614D. Each processing node 612A–612D may include a memory map used to determine which addresses are mapped to which memories 614A–614D, and hence to which processing node 612A–612D a memory request for a particular address should be routed. In one embodiment, the coherency point for an address within computer system 400 is the memory controller 616A–616D coupled to the memory storing bytes corresponding to the address. In other words, the memory controller 616A–616D is responsible for ensuring that each memory access to the corresponding memory 614A–614D occurs in a cache coherent fashion. Memory controllers 616A–616D may include control circuitry for interfacing to memories 614A–614D. Additionally, memory controllers 616A–616D may include request queues for queuing memory requests.

Interface logic 618A–618L may include a variety of buffers for receiving packets from the link and for buffering packets to be transmitted upon the link. Computer system 400 may employ any suitable flow control mechanism for transmitting packets. For example, in one embodiment, each interface logic 618 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 620A–620B may be any suitable I/O devices. For example, I/O devices 620A–620B may include devices for communicate with another computer system to which the devices may be coupled (e.g., network interface cards or modems). Furthermore, I/O devices 620A–620B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

As used herein, the terms "clock cycle" or "cycle" refer to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

Numerous variations and modifications will become apparent to those skilled in the art once the above disclosure is fully appreciated. It is intended that the following claims be interpreted to embrace all such variations and modifications.

What is claimed is:

1. A method, comprising:
   predicting an execution path of a first conditional branch operation stored in an entry of a trace cache;
   in response to predicting said execution path, if a first operation stored in said entry of said trace cache is not in said execution path according to said prediction, dispatching said first operation to a scheduler and assigning to said first operation a non-executable status indicative that said first operation is not in said execution path, wherein assigning said non-executable status comprises marking said first operation as non-executable;

detecting that said prediction is incorrect subsequent to assigning said non-executable status to said first operation;

assigning an executable status to said first operation in response to said detecting, wherein said executable status is indicative that said first operation is in said execution path, and wherein assigning said executable status comprises marking said first operation as executable without refetching said first operation from said trace cache.

2. The method as recited in claim 1, further comprising preventing said first operation from executing in response to assigning said non-executable status to said first operation.

3. The method as recited in claim 1, further comprising issuing said first operation from said scheduler for execution without refetching said first operation from said trace cache in response to assigning said executable status to said first operation.

4. The method as recited in claim 1, further comprising:
determining a destination of said first operation in response to assigning said executable status to said first operation;
determining that a second operation is dependent upon the destination of said first operation in response to determining said destination; and
configuring said second operation to receive a result from said first operation in response to determining that said second operation is dependent upon the destination of said first operation.

5. The method as recited in claim 4, further comprising storing in a destination list a respective destination specified by each unretired operation, wherein determining said destination of said first operation further comprises accessing said destination stored in said destination list.

6. The method as recited in claim 1, further comprising:
in response to predicting said execution path, if said first operation stored in said entry of said trace cache is in said execution path according to said prediction, assigning said executable status to said first operation;
detecting that said prediction is incorrect subsequent to assigning said executable status to said first operation; and
assigning said non-executable status to said first operation in response to said detecting.

7. The method as recited in claim 6, further comprising:
determining a destination of said first operation in response to assigning said non-executable status to said first operation responsive to detecting that said prediction is incorrect;
determining that a second operation is dependent upon the destination of said first operation in response to determining said destination; and
configuring said second operation to receive a result from a source other than said first operation in response to determining that said second operation is dependent upon the destination of said first operation.

8. The method as recited in claim 1, further comprising predicting an execution path of a second conditional branch operation stored in said entry of said trace cache, wherein said first operation is dependent upon said first conditional branch operation and said second conditional branch operation, and wherein assigning an executable status to said first operation in response to said detecting that said prediction of said first conditional branch is incorrect is dependent upon said first operation being in the predicted execution path of said second conditional branch operation.

9. A microprocessor, comprising:
a trace cache comprising a plurality of entries, wherein each entry is configured to store one or more operations;
branch prediction logic configured to predict an execution path of a first conditional branch operation stored in an entry of a trace cache; and
dispatch logic coupled to said branch prediction logic and to said trace cache and configured to:
if a first operation stored in said entry of said trace cache is not in said execution path according to said prediction, dispatch said first operation to a scheduler and assign to said first operation a non-executable status indicative that said first operation is not in said execution path, wherein to assign said non-executable status, said dispatch logic is further configured to mark said first operation as non-executable;
detect that said prediction is incorrect subsequent to assigning said non-executable status to said first operation; and
assign an executable status to said first operation in response to said detecting, wherein said executable status is indicative that said first operation is in said execution path, wherein to assign said executable status, said dispatch logic is further configured to mark said first operation as executable without said first operation being refetched from said trace cache.

10. The microprocessor as recited in claim 9, wherein said scheduler is coupled to receive said first operation from said dispatch logic and configured to store an indication of said non-executable status of said first operation.

11. The microprocessor as recited in claim 10, wherein said scheduler is further configured to prevent said first operation from executing in response to storing said indication of said non-executable status of said first operation.

12. The microprocessor as recited in claim 10, wherein said scheduler is further configured to issue said first operation for execution without said dispatch logic refetching said first operation from said trace cache in response to said dispatch logic assigning said executable status to said first operation.

13. The microprocessor as recited in claim 9, wherein said dispatch logic is further configured to:
determine a destination of said first operation in response to assigning said executable status to said first operation;
determine that a second operation is dependent upon the destination of said first operation in response to determining said destination; and
configure said second operation to receive a result from said first operation in response to determining that said second operation is dependent upon the destination of said first operation.

14. The microprocessor as recited in claim 13, wherein said dispatch logic is further configured to store a respective destination specified by each unretired operation in a destination list and to determine said destination of said first operation by accessing said destination stored in said destination list.

15. The microprocessor as recited in claim 9, wherein said dispatch logic is further configured to:
in response to predicting said execution path, if said first operation stored in said entry of said trace cache is in said execution path according to said prediction, assign said executable status to said first operation;

detect that said prediction is incorrect subsequent to assigning said executable status to said first operation; and assign said non-executable status to said first operation in response to said detecting.

16. The microprocessor as recited in claim 15, wherein said dispatch logic is further configured to:
determine a destination of said first operation in response to assigning said non-executable status to said first operation responsive to detecting that said prediction is incorrect;
determine that a second operation is dependent upon the destination of said first operation in response to determining said destination; and
configure said second operation to receive a result from a source other than said first operation in response to determining that said second operation is dependent upon the destination of said first operation.

17. The microprocessor as recited in claim 9, wherein said branch prediction logic is further configured to predict an execution path of a second conditional branch operation stored in said entry of said trace cache, wherein said dispatch logic is further configured to determine that said first operation is dependent upon said first conditional branch operation and said second conditional branch operation, and wherein said dispatch logic is further configured to assign an executable status to said first operation in response to detecting that said prediction of said first conditional branch is incorrect dependent upon said first operation being in the predicted execution path of said second conditional branch operation.

18. A computer system, comprising:
a system memory; and
a microprocessor coupled to the system memory, wherein the microprocessor comprises:
a trace cache comprising a plurality of entries, wherein each entry is configured to store one or more operations;
branch prediction logic configured to predict an execution path of a first conditional branch operation stored in an entry of a trace cache; and
dispatch logic coupled to said branch prediction logic and to said trace cache and configured to:
if a first operation stored in said entry of said trace cache is not in said execution path according to said prediction, dispatch said first operation to a scheduler and assign to said first operation a non-executable status indicative that said first operation is not in said execution path, wherein to assign said non-executable status, said dispatch logic is further configured to mark said first operation as non-executable;
detect that said prediction is incorrect subsequent to assigning said non-executable status to said first operation; and
assign an executable status to said first operation in response to said detecting, wherein said executable status is indicative that said first operation is in said execution path, wherein to assign said executable status, said dispatch logic is further configured to mark said first operation as executable without said first operation being refetched from said trace cache.

19. The computer system as recited in claim 18, wherein said scheduler is coupled to receive said first operation from said dispatch logic and configured to store an indication of said non-executable status of said first operation.

20. The computer system as recited in claim 19, wherein said scheduler is further configured to prevent said first operation from executing in response to storing said indication of said non-executable status of said first operation.

21. The computer system as recited in claim 19, wherein said scheduler is further configured to issue said first operation for execution without said dispatch logic refetching said first operation from said trace cache in response to said dispatch logic assigning said executable status to said first operation.

22. The computer system as recited in claim 18, wherein said dispatch logic is further configured to:
determine a destination of said first operation in response to assigning said executable status to said first operation;
determine that a second operation is dependent upon the destination of said first operation in response to determining said destination; and
configure said second operation to receive a result from said first operation in response to determining that said second operation is dependent upon the destination of said first operation.

23. The computer system as recited in claim 22, wherein said dispatch logic is further configured to store a respective destination specified by each unretired operations in a destination list and to determine said destination of said first operation by accessing said destination stored in said destination list.

24. The computer system as recited in claim 18, wherein said dispatch logic is further configured to:
in response to predicting said execution path, if said first operation stored in said entry of said trace cache is in said execution path according to said prediction, assign said executable status to said first operation;
detect that said prediction is incorrect subsequent to assigning said executable status to said first operation; and
assign said non-executable status to said first operation in response to said detecting.

25. The computer system as recited in claim 24, wherein said dispatch logic is further configured to:
determine a destination of said first operation in response to assigning said non-executable status to said first operation responsive to detecting that said prediction is incorrect;
determine that a second operation is dependent upon the destination of said first operation in response to determining said destination; and
configure said second operation to receive a result from a source other than said first operation in response to determining that said second operation is dependent upon the destination of said first operation.

26. The computer system as recited in claim 18, wherein said branch prediction logic is further configured to predict an execution path of a second conditional branch operation stored in said entry of said trace cache, wherein said dispatch logic is further configured to determine that said first operation is dependent upon said first conditional branch operation and said second conditional branch operation, and wherein said dispatch logic is further configured to assign an executable status to said first operation in response to detecting that said prediction of said first conditional branch is incorrect dependent upon said first operation being in the predicted execution path of said second conditional branch operation.

* * * * *